(12) United States Patent
Webber et al.

(10) Patent No.: US 11,767,919 B2
(45) Date of Patent: Sep. 26, 2023

(54) METHOD OF USING A PIPE STOPPER

(71) Applicant: Mueller International, LLC, Atlanta, GA (US)

(72) Inventors: James Webber, Decatur, IL (US); Mohammad Unnus Qasim, Decatur, IL (US)

(73) Assignee: Mueller International, LLC, Atlanta, GA (US)

(*) Notice: Subject to any disclaimer, the term of this patent is extended or adjusted under 35 U.S.C. 154(b) by 11 days.

(21) Appl. No.: 17/986,633

(22) Filed: Nov. 14, 2022

(65) Prior Publication Data

US 2023/0071010 A1  Mar. 9, 2023

Related U.S. Application Data

(62) Division of application No. 17/404,310, filed on Aug. 17, 2021, now Pat. No. 11,525,518.

(51) Int. Cl.
| | |
|---|---|
| *F16K 3/24* | (2006.01) |
| *F16K 31/52* | (2006.01) |
| *F16K 3/314* | (2006.01) |
| *F16L 55/105* | (2006.01) |
| *F16L 55/124* | (2006.01) |

(52) U.S. Cl.
CPC ............... *F16K 3/246* (2013.01); *F16K 3/314* (2013.01); *F16K 31/523* (2013.01); *F16L 55/105* (2013.01); *F16L 55/124* (2013.01)

(58) Field of Classification Search
CPC ......... F16K 3/246; F16K 3/314; F16K 31/523; F16L 55/105; F16L 55/124
USPC ............ 138/94; 251/175, 189, 191, 195, 197
See application file for complete search history.

(56) References Cited

U.S. PATENT DOCUMENTS

| | | | |
|---|---|---|---|
| 2,825,528 | A | 3/1958 | Truitt |
| 3,049,333 | A | 8/1962 | Wright et al. |
| 3,543,802 | A | 12/1970 | Leopold, Jr. et al. |
| 3,785,041 | A | 1/1974 | Smith |
| 3,867,964 | A | 2/1975 | Gardner |

(Continued)

FOREIGN PATENT DOCUMENTS

WO    2023023169 A1    2/2023

OTHER PUBLICATIONS

Webber, James; International Search Report and Written Opinion for PCT Application No. PCT/US22/40619, filed Aug. 17, 2022, mailed Nov. 15, 2022, 8 pgs.

(Continued)

*Primary Examiner* — John Bastianelli
(74) *Attorney, Agent, or Firm* — Taylor English Duma LLP (57) ABSTRACT

A method of using a pipe stopper to stop fluid flow through a pipeline includes providing the pipe stopper, the pipe stopper comprising an expandable stopper body and a pressure assembly, the expandable stopper body configurable in an expanded configuration and a contracted configuration, the pressure assembly configurable in an open configuration and a closed configuration and comprising a housing cavity; lowering the expandable stopper body of the pipe stopper into a pipe channel of the pipeline in the contracted configuration; orienting the pressure assembly in the open configuration, wherein an upper portion of the housing cavity is in fluid communication with an atmosphere external to the pipeline and a lower portion of the housing cavity is in fluid communication with the pipe channel; and biasing the expandable stopper body to the expanded configuration to block fluid flow through the pipe channel.

20 Claims, 7 Drawing Sheets

(56) References Cited

U.S. PATENT DOCUMENTS

| | | | |
|---|---|---|---|
| 4,157,169 | A | 6/1979 | Norman |
| 4,285,368 | A | 8/1981 | Terrill et al. |
| 4,369,813 | A | 1/1983 | Thomas |
| 4,477,052 | A | 10/1984 | Knoblauch et al. |
| 6,561,484 | B2 | 5/2003 | Nakagawa et al. |
| 6,810,903 | B1 | 11/2004 | Murphy et al. |
| 7,281,543 | B2* | 10/2007 | Calkins et al. ........ F16L 55/124 138/94 |
| 7,494,107 | B2 | 2/2009 | Sheydayi et al. |
| 7,628,176 | B2* | 12/2009 | Waldo ................. F16L 55/105 138/94 |
| 7,717,136 | B2* | 5/2010 | Sakai .................... F16L 55/12 138/94 |
| 7,731,151 | B2 | 6/2010 | Lee |
| 8,047,219 | B2* | 11/2011 | Puckett et al. ........ F16L 55/105 138/94 |
| 11,525,518 | B1 | 12/2022 | Webber et al. |
| 2006/0237060 | A1 | 10/2006 | Calkins et al. |
| 2023/0072298 | A1 | 3/2023 | Webber et al. |
| 2023/0073873 | A1 | 3/2023 | Webber et al. |

OTHER PUBLICATIONS

Webber, James; Notice of Allowance for U.S. Appl. No. 17/404,310, filed Aug. 17, 2021, mailed Aug. 15, 2022, 13 pgs.
Webber, James; Notice of Allowance for U.S. Appl. No. 17/986,574, filed Nov. 14, 2022, mailed Apr. 3, 2023, 14 pgs.
Webber, James; Notice of Allowance for U.S. Appl. No. 17/986,584, filed Nov. 14, 2022, mailed Mar. 31, 2023, 16 pgs.

* cited by examiner

METHOD OF USING A PIPE STOPPER

CROSS-REFERENCE TO RELATED APPLICATIONS

The present application is a divisional of U.S. Application No. 17/404,310, filed Aug. 17, 2021, which is hereby specifically incorporated by reference herein in its entirety.

TECHNICAL FIELD

This disclosure relates to pipelines. More specifically, this disclosure relates to a pipe stopper assembly for stopping the flow of fluid through a pipeline.

BACKGROUND

Pipelines allow fluid (e.g., gas or liquid) to flow therethrough. Pipelines and components thereof periodically require servicing or replacement, in which case it may be necessary to stop the flow of fluid through the pipeline for a period of time. Typically, a fitting is installed around a pipe of the pipeline and a knife gate valve is mounted to the fitting. The knife gate valve can be selectively opened and closed to allow or prohibit access to the pipe through the fitting. A cutting machine is mounted on the knife gate valve and a cutter is inserted into the fitting through the open knife gate valve and cuts into the pipe within the fitting to create an opening in the pipe. The cutter is then removed and a pipe stopper is inserted into the pipe through the opening to stop the flow of fluid therethrough. Typical pipe stoppers are manually operated, but often require significant force to engage, which can be difficult to provide manually. Additionally, manual operation of the stopper can result in user error, and specifically can result in the pipe stopper not being properly or consistently sealed against the pipeline. If not adequately sealed with the pipeline, fluid in the pipeline can leak past the pipe stopper.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a pipe stopper comprising an expandable stopper body defining a stopper cavity and configurable in an expanded configuration and a contracted configuration; a pressure assembly comprising a pressure housing and a piston, the piston slidably engaged with a housing cavity of the pressure housing, the piston operatively connected to the expandable stopper body; and a valve stem define a stem fluid pathway, the valve stem movable between an open position and a closed position; wherein, in the open position, the stem fluid pathway is in fluid communication with the housing cavity and the expandable stopper body is biased towards the expanded configuration, and in the closed configuration, the stem fluid pathway is not in fluid communication with the housing cavity and the expandable stopper body is biased towards the contracted configuration.

Also disclosed is a pipe stopper assembly comprising a stopper fitting defining a fitting channel, the stopper fitting configured to be mounted to a pipeline; and a pipe stopper positioned in the fitting channel and comprising an expandable stopper body and a pressure assembly, the expandable stopper body configurable in an expanded configuration and a contracted configuration, the pressure assembly configurable in an open configuration and a closed configuration; wherein, in the open configuration, the expandable stopper body is biased to the expanded configuration, and in the closed configuration, the expandable stopper body is biased to the contracted configuration; and wherein, in the expanded configuration, fluid is prohibited from flowing through the fitting channel, and a contracted configuration, wherein fluid is permitted to flow through the fitting channel.

Also disclosed is a method of using a pipe stopper to stop fluid flow through a pipeline, the method comprising: providing the pipe stopper, the pipe stopper comprising an expandable stopper body and a pressure assembly, the expandable stopper body configurable in an expanded configuration and a contracted configuration, the pressure assembly configurable in an open configuration and a closed configuration and comprising a housing cavity; lowering the expandable stopper body of the pipe stopper into a pipe channel of the pipeline in the contracted configuration; orienting the pressure assembly in the open configuration, wherein an upper portion of the housing cavity is in fluid communication with an atmosphere external to the pipeline and a lower portion of the housing cavity is in fluid communication with the pipe channel; and biasing the expandable stopper body to the expanded configuration to block fluid flow through the pipe channel.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a pipe stopper and associated methods, systems, devices, and various apparatus. Example aspects of the pipe stopper can comprise an expandable stopper body and an actuation device. It would be understood by one of skill in the art that the disclosed pipe stopper is described in but a few exemplary aspects among many. No particular terminology or description should be considered limiting on the disclosure or the scope of any claims issuing therefrom.

Figure 1:
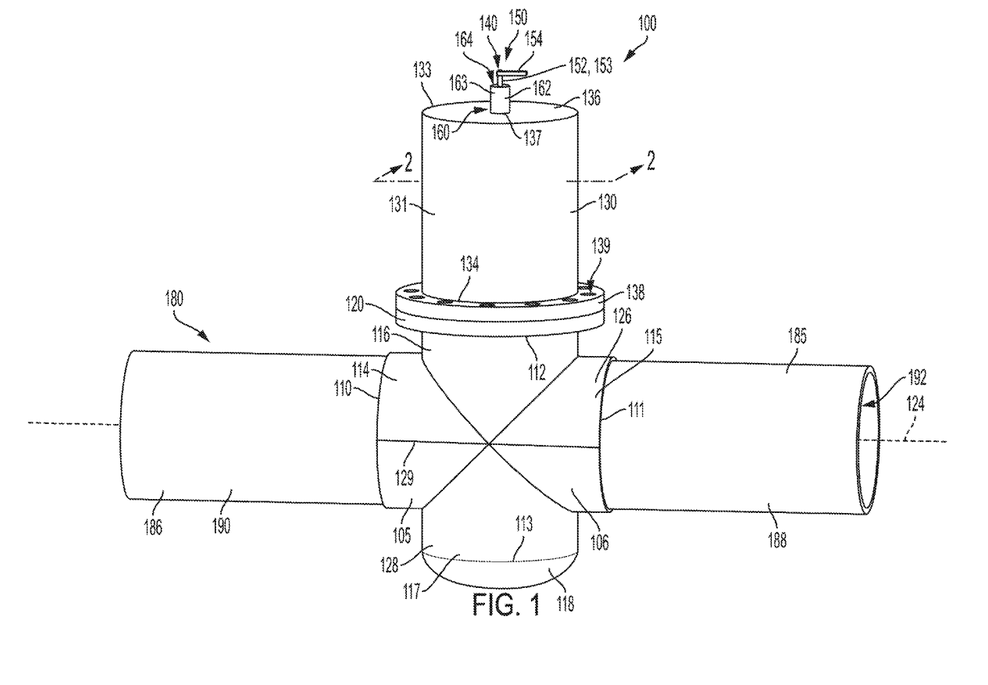
FIG. 1 is a front perspective view of a pipe stopper assembly in accordance with one aspect of the present disclosure, wherein the pipe stopper assembly is assembled with a pipeline.

FIG. 1 illustrates a top perspective view of a pipe stopper assembly 100, according to the present disclosure. The pipe stopper assembly 100 can be assembled with a pipeline 180, as shown. The pipeline 180 can be configured to transport pipeline fluids, such as liquids, gases, or the like. For example, in the present aspect, the pipeline fluid can be a gas; however, in other aspects, the pipeline fluid can be a liquid, such as water. In the present aspect, the pipe stopper assembly 100 can be assembled to a singular pipe 185 of the pipeline 180. However, in other aspects, the pipe stopper assembly 100 can be assembled with and can connect a pair of pipes. According to example aspects, the pipe stopper assembly 100 can comprise a stopper fitting 105, a stopper bonnet 130, and a pipe stopper 140. The stopper fitting 105 can be configured as a tee fitting, as shown, or as any other suitable fitting known in the art. Example aspects of the stopper fitting 105 can define an outer fitting surface 106, an inner fitting surface 200 (shown in FIG. 2A), an inlet fitting end 110, an outlet fitting end 111, an upper fitting end 112, and a lower fitting end 113. The stopper fitting 105 can comprise an inlet fitting arm 114 extending from the inlet fitting end 110 towards the outlet fitting end 111 and an outlet fitting arm 115 extending from the outlet fitting end 111 towards the inlet fitting end 110. The stopper fitting 105 can further comprise an upper fitting arm 116 extending from the upper fitting end 112 to the inlet and outlet fitting arms 114,115, and a lower fitting arm 117 extending from the lower fitting end 113 to the inlet and outlet fitting arms 114,115. A lower fitting cap 118 can be secured to the lower fitting arm 117 at the lower fitting end 113. A fitting mounting flange 120 can be coupled to the upper fitting arm 116 at the upper fitting end 112. The inner fitting surface 200 can define a fitting channel 201 (shown in FIG. 2A), which in the present aspect can be substantially t-shaped, as described in further detail below.

Figure 2A:
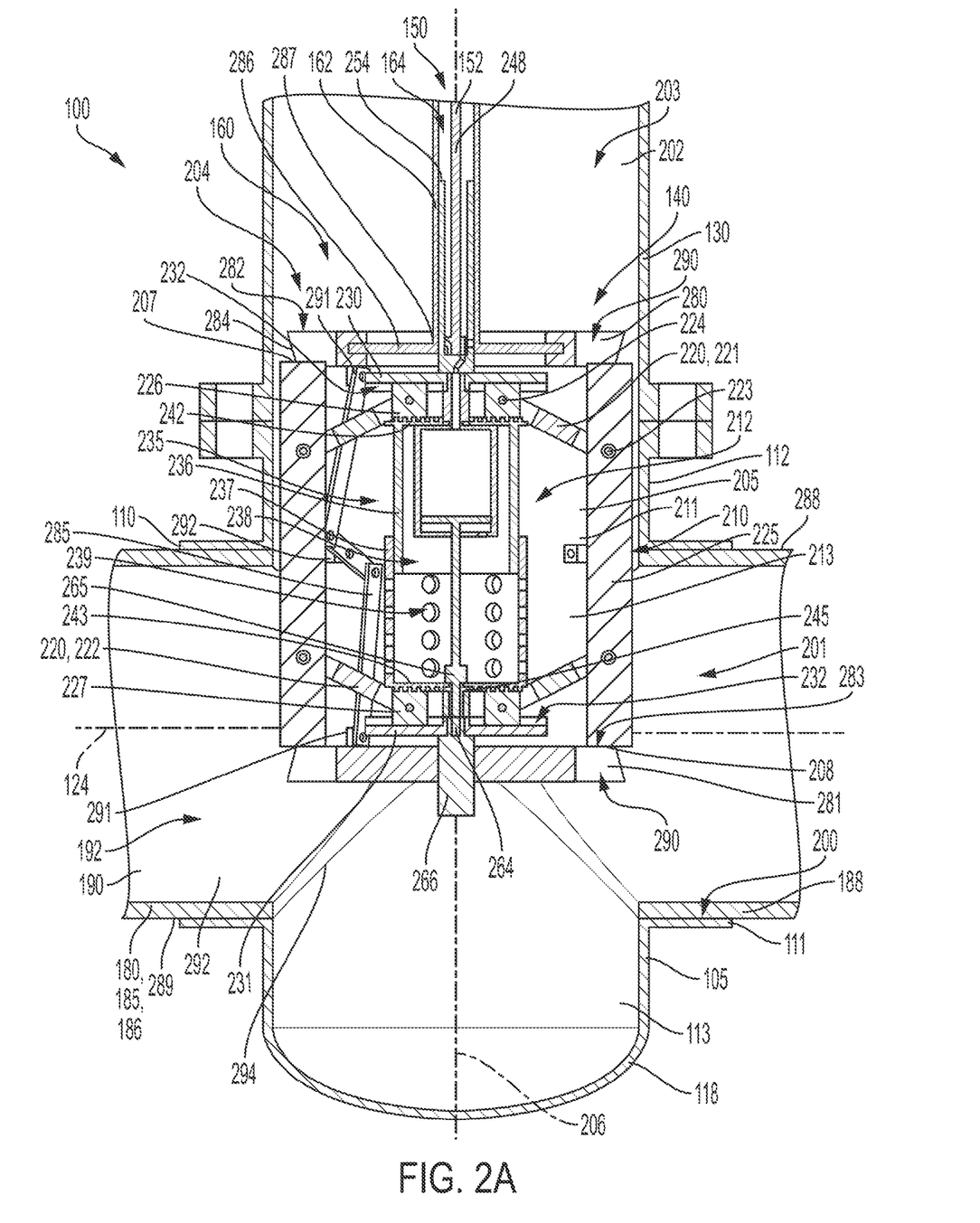
FIG. 2A is a cross-sectional view of the pipe stopper assembly of FIG. 1 taken along line 2-2 in FIG. 1, wherein a pipe stopper of the pipe stopper assembly is in a raised position and a contracted configuration.

As shown, the pipe 185 can extend through the fitting channel 201 from the inlet fitting end 110 to the outlet fitting end 111. Thus, the pipe 185 can define an inlet pipe section 186 adjacent to the inlet fitting end 110 and an outlet pipe section 188 adjacent to the outlet fitting end 111. Example aspects of the pipe 185 can define a pipe sidewall 190, and the pipe sidewall 190 can define a pipe channel 192. Furthermore, example aspects of the stopper fitting 105 can define a fitting axis 124 extending through the fitting channel 201 from the inlet fitting end 110 to the outlet fitting end 111, and the pipe channel 192 can be substantially coaxial with the stopper fitting 105, as shown. In some aspects, the stopper fitting 105 can comprise an upper segment 126 and a lower segment 128, which can be assembled around the pipe 185 and secured together. For example, in the present aspect, the upper segment 126 and lower segment 128 can be sealed together at one or more seal lines 129 by welding. In other aspects, any other fasteners or fastening techniques can be used to secure the upper segment 126 to the lower segment 128. For example, in other aspects, each of the upper segment 126 and the lower segment 128 can define a flange along the corresponding seal line 129, and the flanges can be secured together by one or more fasteners, such as nut and bolt assemblies, for example and without limitation.

Example aspects of the stopper bonnet 130 can be substantially cylindrical and can defining an outer bonnet surface 131, an inner bonnet surface 202 (shown in FIG. 2A), an upper bonnet end 133, and a lower bonnet end 134. The inner bonnet surface 202 can define a bonnet cavity 203 (shown in FIG. 2A), which can be open at the lower bonnet end 134. Example aspects of the stopper bonnet 130 can further comprise a bonnet top plate 136 formed at the upper bonnet end 133 to seal the bonnet cavity 203 at the upper bonnet end 133. As shown, the stopper bonnet 130 can define a bonnet mounting flange 138 at the lower bonnet end 134. In example aspects, the stopper bonnet 130 can be removably secured to the stopper fitting 105 by securing the bonnet mounting flange 138 to the fitting mounting flange 120. A plurality of mounting holes 139 can be formed through each of the fitting mounting flange 120 and the bonnet mounting flange 138, and each of the mounting holes 139 of the fitting mounting flange 120 can be aligned with a corresponding mounting hole 139 of the bonnet mounting flange 138. A fastener (not shown) can extend through each corresponding pair of mounting holes 139 to secure the stopper bonnet 130 to the stopper fitting 105. The fasteners can be screws, nut and bolt assemblies, rivets, or any other suitable fastener known in the art. In other aspects, any other suitable fastening technique can be used to secure the stopper bonnet 130 to the stopper fitting 105, such as welding, adhesives, and the like. In some aspects, a knife gate valve can be installed between the stopper fitting 105 and the stopper bonnet 120. The knife gate valve can be selectively open and closed to allow and prohibit access to the stopper fitting 105 through the upper fitting end 112 thereof.

According to example aspects, the stopper fitting 105 and the stopper bonnet 130 can be formed from a metal material such as, for example, steel. However, other example aspects of the stopper fitting 105 and/or the stopper bonnet 130 can be formed from any other suitable metal material, including, but not limited to, iron, carbon, bronze, or another iron material, or can be formed from a non-metal material, such as, for example, plastic or any other suitable non-metal material known in the art.

Figure 3:
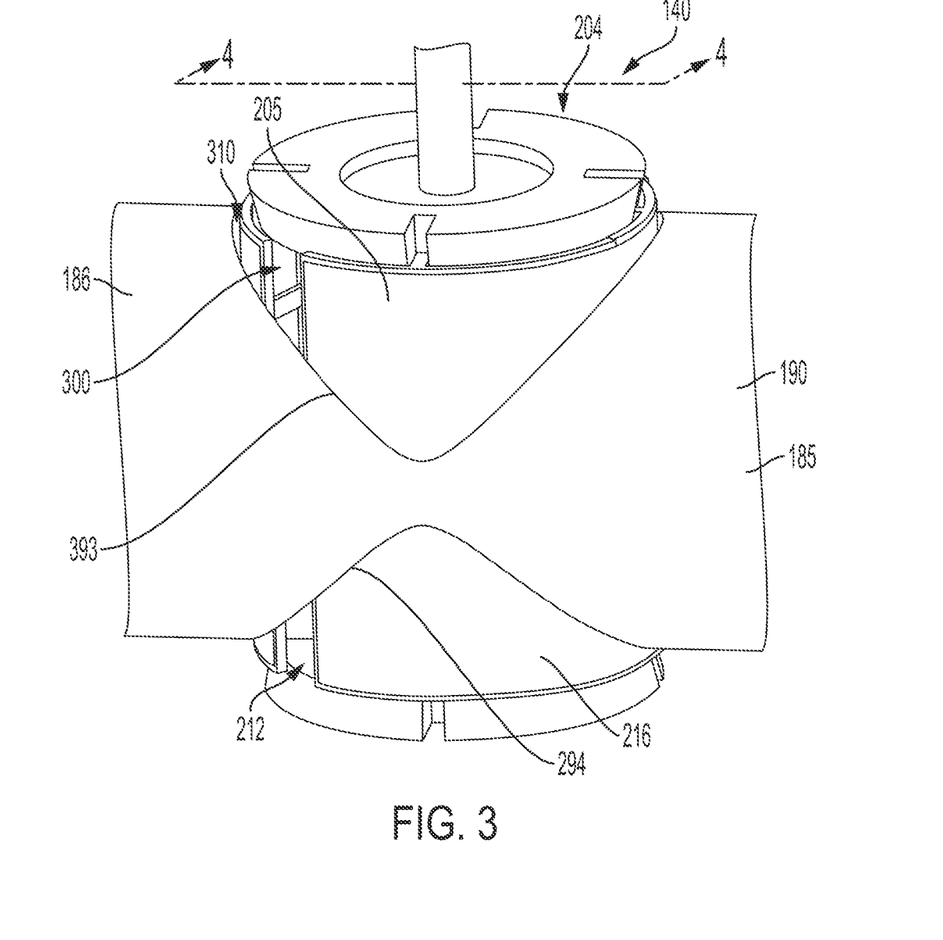
FIG. 3 illustrates a top perspective view of the pipe stopper of FIG. 2A in a lowered position and in the contracted configuration.
Figure 4:
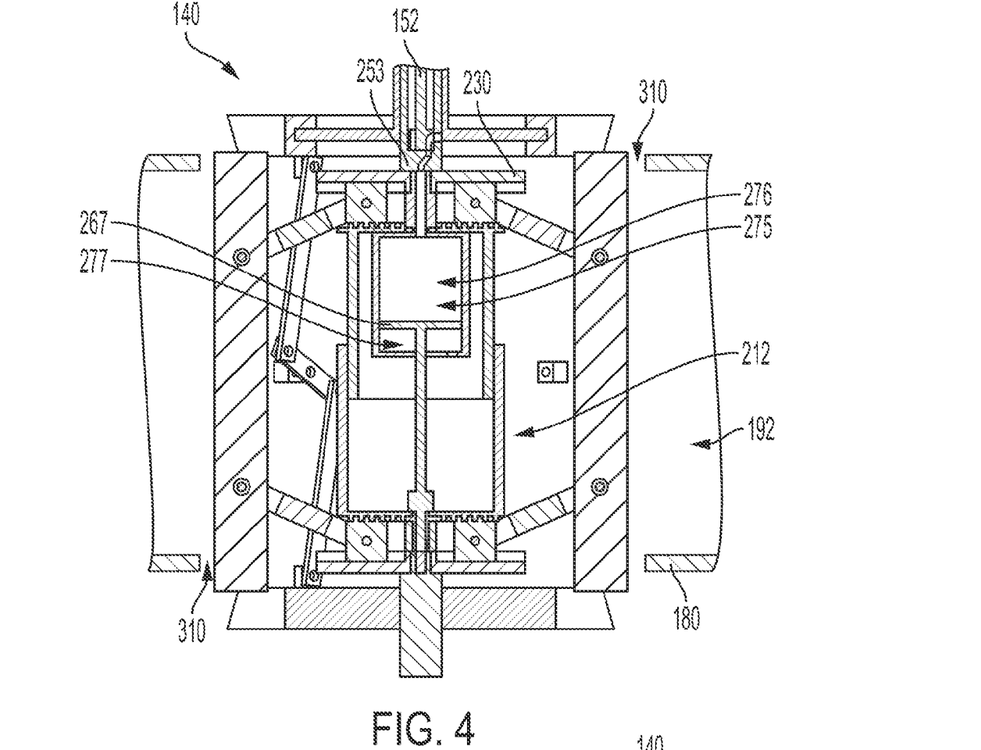
FIG. 4 illustrates a cross-section view of the pipe stopper of FIG. 2A in the lowered position and in the contracted configuration, taken along line 4-4 in FIG. 3.
Figure 5:
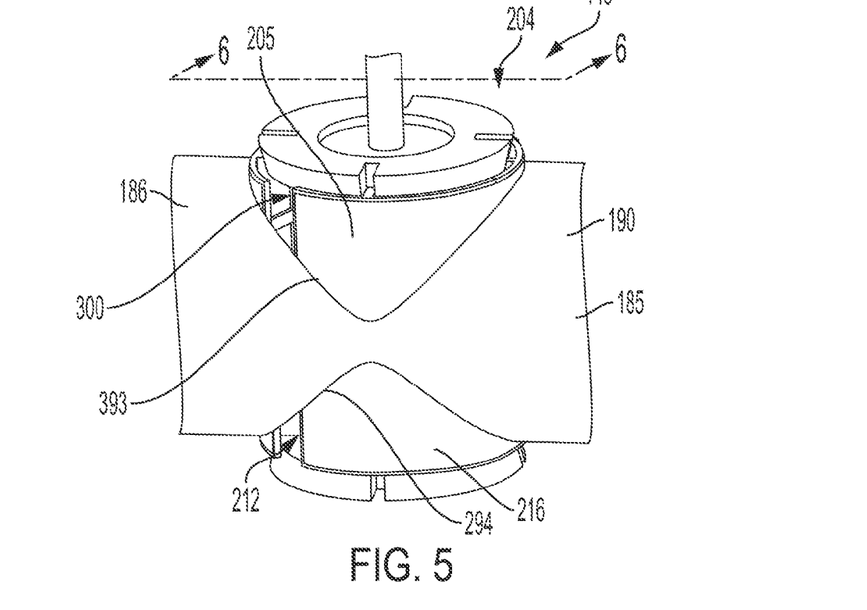
FIG. 5 illustrates a front perspective view of the pipe stopper of FIG. 2A in the lowered position and in an expanded configuration.
Figure 6:
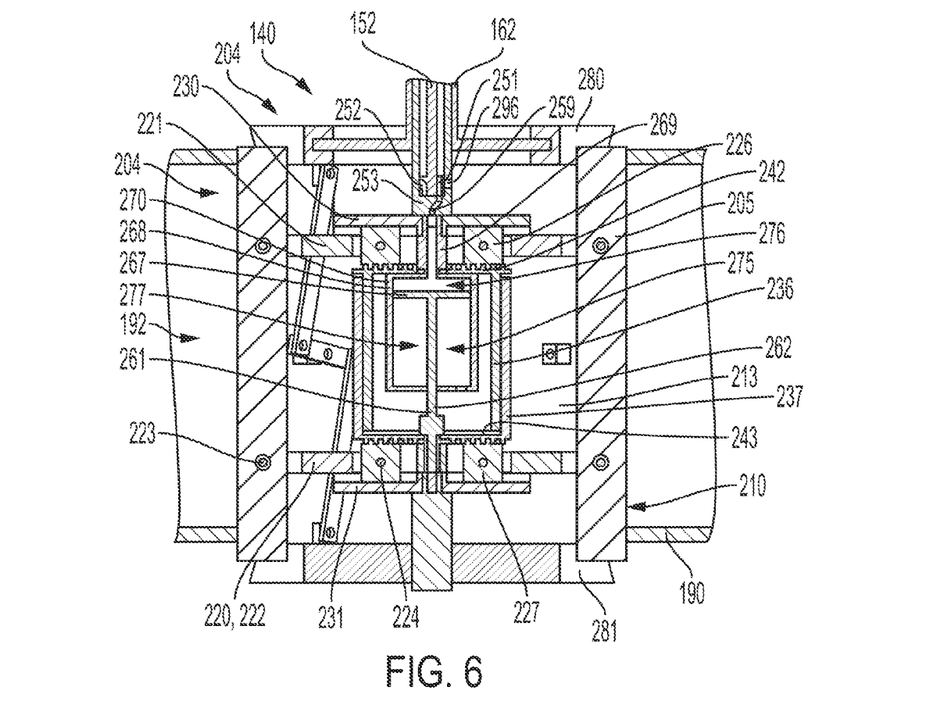
FIG. 6 is a cross-section view of the pipe stopper of FIG. 2A in the lowered position and the expanded configuration, taken along line 6-6 in FIG. 5, wherein an upper locking ring and a lower locking ring of the pipe stopper are in an unlocked configuration.
Figure 7:
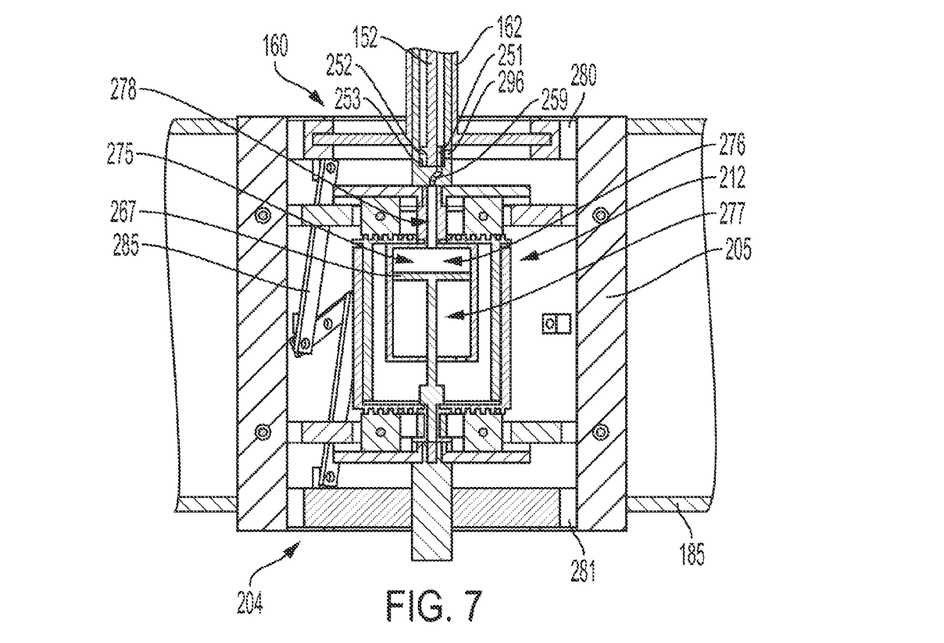
FIG. 7 is another cross-section view of the pipe stopper of FIG. 2A in the lowered position and in the expanded configuration, taken along line 6-6 in FIG. 5, wherein the upper locking ring and the lower locking ring of FIG. 6 are in a locked configuration.

Example aspects of the pipe stopper 140 can comprise an expandable stopper body 204 (shown in FIG. 2A) and an actuation device 150. According to example aspects, the expandable stopper body 204 can be movable within the bonnet cavity 203 and the fitting channel 201 between a raised position, as shown in FIG. 2A, and a lowered position, as shown in FIGS. 3-7. The expandable stopper body 204 can also be reconfigurable between a contracted configuration, as shown in FIGS. 2-4, and an expanded configuration, as shown in FIGS. 5-7. The expandable stopper body 204 can be naturally biased to the contracted configuration, as described in further detail below. The actuation device 150 can be configured to selectively move the expandable stopper body 204 between the raised position and lowered position and to selectively allow the expandable stopper body 204 to be biased between the contracted and expanded configurations. Example aspects of the actuation device 150 can comprise a valve stem 152 and an actuation handle 154. The valve stem 152 can extend through a bonnet opening 137 in the bonnet top plate 136 and into the bonnet cavity 203. The actuation handle 154 can be coupled to the valve stem 152 at an upper stem end 153 thereof outside of the bonnet cavity 203, such that the actuation handle 154 can be accessible to an operator. In other aspects, the actuation device 150 may not be accessible. In example aspects, the actuation device 150 can be raised and lowered to move the pipe stopper 140 between the raised and lowered positions. Furthermore, the actuation device 150 can be rotated to allow the expandable stopper body 204 to be biased from the contracted configuration to the expanded configuration, and vice versa. An operator, tool, or machine, can engage the actuation device 150 to facilitate raising, lowering, or rotating the valve stem 152. In some aspects, the pipe stopper 140 can further comprise a locking assembly 160 comprising a hollow locking shaft 162 configured to extend through the bonnet opening 137 in the bonnet top plate 136, The locking shaft 162 can be substantially cylindrical and can define a locking shaft channel 164 therethrough. As shown, the locking shaft 162 can define an upper locking shaft end 163 disposed outside of the bonnet cavity 203, and the upper locking shaft end 163 can be open to allow access to the locking shaft channel 164. Thus, in the present aspect, fluid in the locking shaft channel 164 can flow into the surrounding atmosphere at the upper locking shaft end 163, as described in further detail below.

Figure 2B:
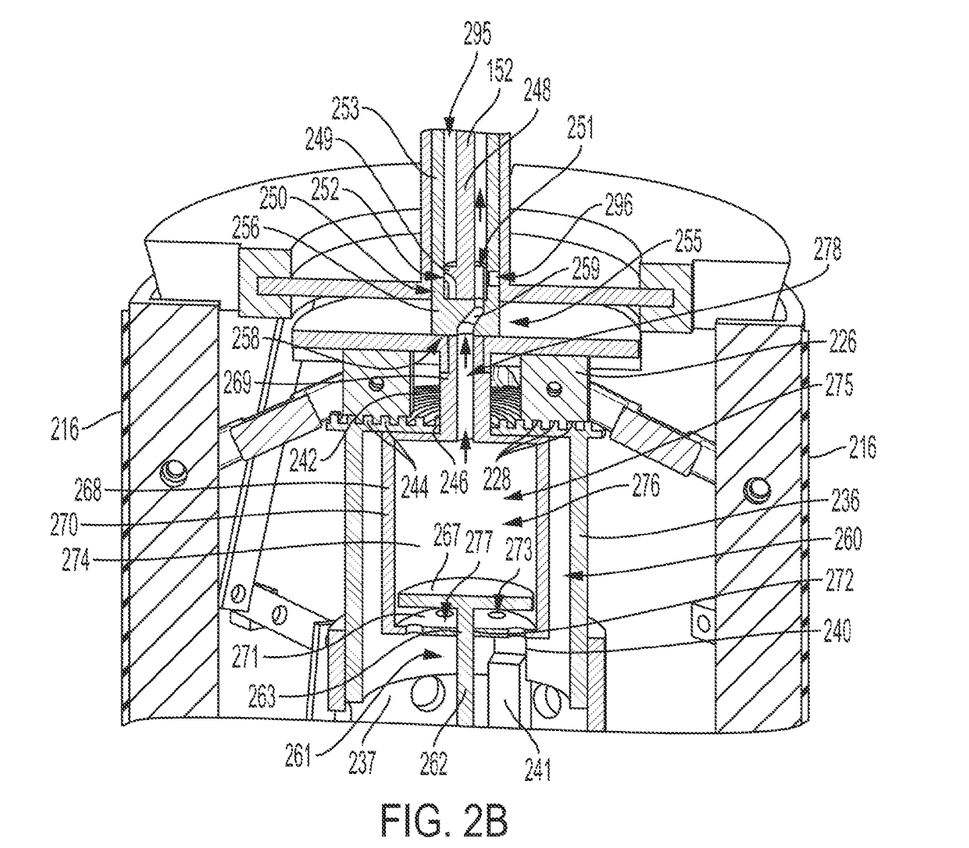
FIG. 2B is a detail cross-sectional view of the pipe stopper of FIG. 2A, taken along line 2-2 in FIG. 1.

FIG. 2A illustrates a cross-sectional view of the pipe stopper assembly 100 assembled with the pipeline 180, and FIG. 2B illustrates a detail cross-sectional view of the pipe stopper assembly 100, both taken along line 2-2 in FIG. 1. As described above, the fitting channel 201 can be substantially t-shaped and can extend from the inlet fitting end 110 to the outlet fitting end 111, and from the upper fitting end 112 to the lower fitting end 113. The lower fitting cap 118 can be configured to seal the fitting channel 201 at the lower fitting end 113, as shown. Furthermore, the fitting channel 201 can be in fluid communication with the bonnet cavity 203, as shown. Example aspects of the pipe 185 can define a substantially cylindrical pipe sidewall 190, and the pipe sidewall 190 can define the pipe channel 192, as shown. The pipe 185 can define the inlet pipe section 186 adjacent to the inlet fitting end 110 and the outlet pipe section 188 adjacent to the outlet fitting end 111. A central pipe section 292 of the pipe 185 can extend through the fitting channel 201 from the inlet fitting end 110 to the outlet fitting end 111. According to example aspects, the central pipe section 292 of the pipe 185 can define an upper pipe opening 393 (shown in FIG. 3) formed through the pipe sidewall 190 and a lower pipe opening 294 formed through the pipe sidewall 190, each allowing access to the pipe channel 192. The upper pipe opening 393 can be aligned with the upper fitting arm 116 (shown in FIG. 1), and the lower pipe opening 294 can be aligned with the lower fitting arm 117 (shown in FIG. 1). As such, the pipe channel 192 can also be in fluid communication with the fitting channel 201 and the bonnet cavity 203.

According to example aspects, the upper pipe opening 393 and the lower pipe opening 294 can be formed through the pipe 185 by a cutting machine. The cutting machine can be mounted to the stopper fitting 105 and a cutter of the cutting machine can be inserted into the stopper fitting 105 through the upper fitting end 112. In aspects of the pipe stopper assembly 100 comprising the knife gate valve, the knife gate valve can be opened to allow the cutter to be inserted into the stopper fitting 105. The cutter can cut through the pipe 185 at an upper pipe end 288 thereof to cut an upper pipe coupon therefrom and to form the upper pipe opening 393 therethrough. Similarly, the cutter can cut through the pipe 185 at a lower pipe end 289 thereof to cut a lower pipe coupon therefrom and to form the lower pipe opening 294 therethrough. The upper and lower pipe coupons can then be removed from the pipe 185. The cutting machine can also be removed from the pipe stopper assembly 100 after forming the upper and lower pipe openings 393,294.

In normal operation, pipeline fluid (e.g., gas) can flow through the central pipe section 292 of the pipeline 180 within the fitting channel 201 from the inlet fitting end 110 to the outlet fitting end 111, and thus, can be transmitted from the inlet pipe section 186 to the outlet pipe section 188. In some instances, pipeline fluid can flow through the central pipe section 292 within the fitting channel 201 in the reverse direction, from the outlet fitting end 111 to the inlet fitting end 110, as desired. According to example aspects, the expandable stopper body 204 can be inserted into the fitting channel 201 through the upper fitting end 112 (shown in FIG. 1) and into pipe channel 192 through the upper pipe opening 393. As shown, in the raised position, the expandable stopper body 204 can be raised fully or partially out of the pipe channel 192 to allow pipeline fluid to flow through the pipe channel 192. For example, in the raised position, the expandable stopper body 204 can be elevated away from the lower pipe opening 294 of the pipe 185 and can be oriented fully or partially within the bonnet cavity 203 and/or a portion of the fitting channel 201 defined by the upper fitting arm 116. In some aspects, the expandable stopper body 204 can remain partially inserted into the pipe channel 192 while in the raised position, as shown, while in other aspects, the expandable stopper body 204 can be fully withdrawn from the pipe channel 192 in the raised position. In the lowered position, the expandable stopper body 204 can extend through each of the upper pipe opening 393 and lower pipe opening 294, and can be expanded to seal with the pipe sidewall 190 to block pipeline fluid from flowing through the pipe channel 192, as described in further detail below.

Example aspects of the expandable stopper body 204 can comprise a substantially cylindrical shell, such as a split shell 205. As shown, the split shell 205 can define an upper shell end 207 and a lower shell end 208. The split shell 205 can further define a stopper axis 206 extending centrally therethrough from the upper shell end 207 to the lower shell end 208. The stopper axis 206 can be substantially perpendicular to the fitting axis 124. In example aspects, the split shell 205 can define an opening therethrough, such as a longitudinal shell slot 300 (shown in FIG. 3) extending from the upper shell end 207 to the lower shell end 208. The split shell 205 can further define an outer surface 210 and an inner surface 211. The inner surface 211 can define a stopper cavity 212, as shown, and the shell slot 300 can connect the stopper cavity 212 in fluid communication with the pipe channel 192 and the fitting channel 201. According to example aspects, the split shell 205 can comprise an arcuate shell body 213 extending from the upper shell end 207 to the lower shell end 208. The arcuate shell body 213 can be substantially elastic or can define an elastic region to allow for bending of the arcuate shell body 213 from the contracted configuration to the expanded configuration. In the contracted configuration, as shown, the arcuate shell body 213 can be naturally biased radially inward. In the expanded configuration, the arcuate shell body 213 can bend radially outward to increase a diameter of the split shell 205. Example aspects of the split shell 205 can be formed from a metal material, such as steel for example. Other aspects of the split shell 205 can be formed from any other suitable known in the art, including other types of metals, plastics, composites, and the like. In some aspects, a resilient layer or coating, such as a sealing layer 216 (shown in FIG. 2B), can be applied to the outer surface 210 of the split shell 205. The sealing layer 216 can seal with the upper and lower pipe openings 393,294 in the expanded configuration to create a fluid tight seal between the split shell 205 and the pipe 185. The sealing layer 216 can comprise any suitable resilient material, including rubbers, plastics, and the like. In some aspects, the sealing layer 216 can comprise urethane.

In example aspects, the arcuate shell body 213 can be operatively connected to the actuation device 150. As shown, the pipe stopper 140 can comprise one or more actuation arms 220 disposed within the stopper cavity 212 and connected to the arcuate shell body 213. In the present aspect, the actuation arms 220 can comprise upper actuation arms 221 and lower actuation arms 222, and each of the upper actuation arms 221 and lower actuation arms 222 can be pivotably connected to the arcuate shell body 213. In the contracted configuration of the pipe stopper assembly 100, as shown, each of the upper actuation arms 221 and lower actuation arms 222 can be oriented at an angle relative to the horizontal. In some aspects, a distal arm end 223 of each of the actuation arms 220 can be pivotably connected to a bracket wall 225 extending radially inward, relative to the stopper axis 206, from the arcuate shell body 213. Furthermore, a proximal arm end 224 of each of the upper actuation arms 221 can be pivotably connected to an upper chuck block 226, and the proximal arm end 224 of each of the lower actuation arms 222 can be pivotably connected to a lower chuck block 227. The upper and lower actuation arms 221,221 can be pivotably connected to the bracket walls 224 and the corresponding upper and lower chuck blocks 226,227 by fasteners. For example, the fasteners can be nut and bolt assemblies or any other suitable fastener known in the art. Other aspects of the expandable stopper body 204 can comprise more or fewer actuation arms 220 connected to the arcuate shell body 213. According to example aspects, the actuation arms 220 can be configured to bias the arcuate shell body 213 outward to the expanded configuration and to contract the arcuate shell body 213 inward in the contracted configuration. As the arcuate shell body 213 is biased outward or contracted inward, the arcuate shell body 213 can bend, allowing the diameter of split shell 205 to increase and decrease, respectively.

Example aspects of the pipe stopper 140 can further comprise an upper actuation plate 230, a lower actuation plate 231, and a swivel assembly 235 disposed between the upper actuation plate 230 and lower actuation plate 231. The swivel assembly 235 can comprise an upper swivel cylinder 236 and a lower swivel cylinder 237. As shown, the upper swivel cylinder 236 and lower swivel cylinder 237 can together define a swivel cavity 238. According to example aspects, the upper swivel cylinder 236 can be configured to telescope within the lower swivel cylinder 237. The lower swivel cylinder 237 can define a plurality of cylinder openings 239 formed therethrough, such that the swivel cavity 238 can be in fluid communication with the stopper cavity 212. In other aspects, the upper swivel cylinder 236 can also or alternatively define the cylinder openings 239 therethrough. In the present aspect, the upper swivel cylinder 236 can define a longitudinal cylinder slot 240 (shown in FIG. 2B) formed therethrough, and the lower swivel cylinder 237 can define a longitudinal cylinder rib 241 (shown in FIG. 2B) extending radially inward and slidably engaging the longitudinal cylinder slot 240. The cylinder rib 241 can slide within the cylinder slot 240 as the upper swivel cylinder 236 telescopes relative to the lower swivel cylinder 237.

Furthermore, the upper swivel cylinder 236 can define an upper swivel plate 242, and the lower swivel cylinder 237 can define a lower swivel plate 243. According to example aspects, the upper chuck blocks 226 can be disposed between the upper actuation plate 230 and the upper swivel plate 242, and the lower chuck blocks 227 can be disposed between the lower actuation plate 231 and the lower swivel plate 243. Each of the upper and lower chuck blocks 226,227 can engage a block recess 232 of the corresponding upper or lower actuation plate 230,231, and can be configured to slide radially within the corresponding block recess 232, relative to the stopper axis 206. Additionally, each of the upper swivel plate 242 and the lower swivel plate 243 can define a spiral track 244 extending therefrom, and each of the upper chuck blocks 226 and the lower chuck blocks 227 can define one or more arcuate recesses 228 (shown in FIG. 2B). The spiral track 244 of the upper swivel plate 242 can slidably engage the arcuate recesses 228 of the upper chuck blocks 226, and the spiral track 244 of the lower swivel plate 243 can slidably engage the arcuate recesses 228 of the lower chuck blocks 227. In example aspects, the swivel assembly 235 can be rotated to slide the spiral tracks 244 of the upper and lower swivel plates 242,243 within the arcuate recesses 228 of the corresponding upper and lower chuck blocks 226,227, respectively. The upper and lower chuck blocks 226,227 can slide radially inward and outward within the corresponding block recess 232 of the upper and lower actuation plates 230,231, respectively, as they ride on the rotating spiral track 244, depending upon which way the swivel assembly 235 is rotated. Thus, rotating the swivel assembly 235 can adjust the radial position of the upper and lower chuck blocks 226,227 with the corresponding block recesses 232, relative to the stopper axis 206. The positioning of the upper and lower chuck blocks 226,227 can be set while the pipe stopper 140 is in the raised position, and can determine the amount of force that the pipe stopper 140 can exert against the pipe 185 in the expanded configuration. In some aspects, the positioning of the upper and lower chuck blocks 226,227 can be set prior to assembling the pipe stopper assembly 100 with the pipeline 180. According to example aspects, the adjustment of the upper and lower chuck blocks 226,227 can also adjust a diameter of the pipe stopper 140 to accommodate upper and lower pipe openings 393,294 of varying sizes. For example, the upper and lower chuck blocks 226,227 can be adjusted to accommodate slightly oversized or slightly undersized upper and lower pipe openings 393,294. The adjustment of the upper and lower chuck blocks 226,227 is described in further detail below.

Figure 2C:
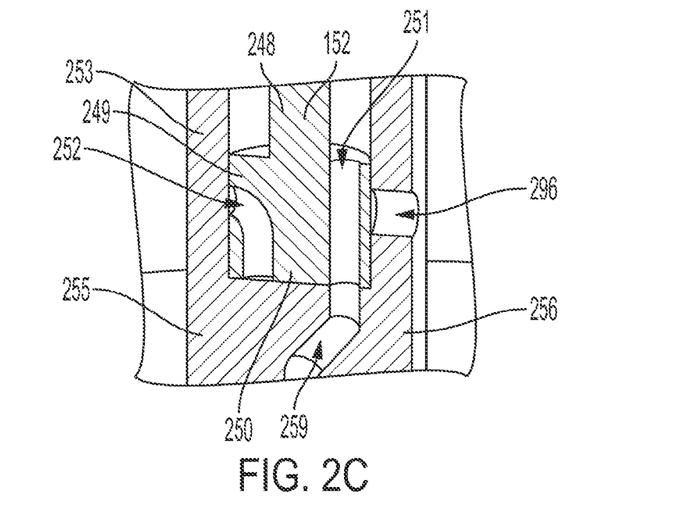
FIG. 2C is a detail cross-sectional view of a valve stem of the pipe stopper of FIG. 2A, taken along line 2-2 in FIG. 1, wherein the valve stem is in an open position.

Referring to FIG. 2B, as shown, the valve stem 152 can define an elongate stem body 248 and a stem base 249. The elongate stem body 248 can extend to the upper stem end 153 (shown in FIG. 1), and the stem base 249 can be oriented at a lower stem end 250 thereof. In the present aspect, the stem base 249 can define a diameter than can be greater than a diameter of the elongate stem body 248. According to example aspects, the pipe stopper 140 can further comprise a hollow valve shaft 253 defining a shaft channel 295. The valve shaft 253 can define an upper shaft end 254 (shown in FIG. 2A) and a lower shaft end 255. The upper shaft end 254 of the valve shaft 253 can be disposed within the locking shaft channel 164 of the locking shaft 162, and the valve shaft 253 can be configured to slide within the locking shaft channel 164. Moreover, the upper shaft end 254 can be open to allow access to the shaft channel 295, and thus, the shaft channel 295 can be in fluid communication with the locking shaft channel 164. The lower shaft end 255 of the valve shaft 253 can be disposed within the stopper cavity 212, and the valve shaft 253 can be secured to the upper actuation plate 230 at the lower shaft end 255, as shown. A lower shaft wall 256 can be formed at the lower shaft end 255 to enclose the shaft channel 295 at the lower shaft end 255. As shown in FIGS. 2B and 2C, in example aspects, the valve stem 152 can extend into the shaft channel 295 at the upper shaft end 254, and the stem base 249 of the valve stem 152 can abut the lower shaft wall 256 within the shaft channel 295. As shown, a stem fluid pathway 251 can extend through the stem base 249 and can be in fluid communication with the shaft channel 295. Example aspects of the lower shaft wall 256 can further define an external surface 258 at the lower shaft end 255, and a shaft fluid pathway 259 can extend through the lower shaft wall 256 from the internal surface to the external surface 258.

According to example aspects, the swivel assembly 235 can be rotated by applying a force thereto. For example, the swivel assembly 235 can be rotated by manually by hand or by a tool. In other aspects, the rotation of the swivel assembly 235 can be driven by any other suitable drive mechanisms known in the art. With the expandable stopper body 204 in the contracted configuration, the proximal arm ends 224 of the upper actuation arms 221 can be biased radially inward as the swivel assembly 235 rotates, which in turn can slide the upper chuck blocks 226 radially inward within the corresponding block recesses 232 of the upper actuation plate 230. As the upper chuck blocks 226 slide radially inward, the engagement of the corresponding arcuate recesses 228 with the spiral track 224 of the upper swivel plate 242 can rotate the upper swivel cylinder 236. As described above, the longitudinal cylinder rib 241 of the lower swivel cylinder 237 can engage the longitudinal cylinder slot 240 of the upper swivel cylinder 236, such that the upper swivel cylinder 236 and lower swivel cylinder 237 can rotate in unison. Thus, as the upper swivel cylinder 236 rotates, the lower swivel cylinder 237 can rotate to slide the lower chuck blocks 227 radially inward.

According to example aspects, the valve stem 152 can be rotated between an open position, as shown, and a closed position. The valve stem 152 can be rotated manually or can be machine driven. In the open position, as shown, the stem fluid pathway 251 can be aligned with the shaft fluid pathway 259. When the stem fluid pathway 251 is aligned with the shaft fluid pathway 259, pipeline fluid (e.g. gas) in the shaft fluid pathway 259 can flow to the shaft channel 295 by way of the stem fluid pathway 251. The valve stem 152 can further be rotated to a closed position, as shown, to selectively move the stem fluid pathway 251 out of alignment with the shaft fluid pathway 259 to prohibit fluid flow between the shaft fluid pathway 259 and the shaft channel 295. Example aspects of the stem base 249 can further define an equalization fluid pathway 252, which can be in fluid communication with the shaft fluid pathway 259 when the valve stem 152 is in the closed position. The equalization fluid pathway 252 can further be aligned with a shaft opening 296 formed through the valve shaft 253 in the closed position. In example aspects, a clearance can be provided between the valve shaft 253 and the locking shaft 162 such that the shaft opening 296 can be in fluid communication with the stopper cavity 212. Alternatively, the shaft opening 296 can be oriented external to the locking shaft 162 (e.g., positioned below the locking shaft 162, relative to the orientation shown) so that the shaft opening 296 can be in fluid communication with the stopper cavity 212. FIG. 2C illustrates the valve stem 152 and the valve shaft 253 in further detail.

Example aspects of the pipe stopper 140 can further comprise a pressure assembly 260 configurable in an open configuration and a closed configuration. The pressure assembly 260 can comprise a piston 261 and a pressure housing 268. The pressure housing 268 can define a housing neck 269 and a housing cylinder 270. An internal housing surface 274 of the pressure housing 268 can define a housing cavity 275 within the housing cylinder 270 and a neck channel 278 within the housing neck 269. The housing cavity 275 and housing neck 269 can be in fluid communication. Furthermore, the external surface 258 of the lower shaft wall 256 can abut the housing neck 269 distal to the housing cylinder 270, and the shaft fluid pathway 259 of the valve shaft 253 can be in fluid communication with the neck channel 278. When the valve stem 152 is in the open position, fluid can flow between from the housing cavity 275 of the pressure housing 268 to the shaft channel 295 of the valve shaft 253, as indicated by the directional arrows. According to example aspects, the housing cylinder 270 can be disposed within the swivel cavity 238 of the swivel assembly 235, and can abut the upper swivel plate 242. The housing neck 269 can extend through an upper plate opening 246 formed through the upper swivel plate 242, and the upper actuation plate 230 can be mounted to the housing neck 269 adjacent to the lower shaft end 255 of the valve shaft 253, distal to the housing cylinder 270.

Example aspects of the piston 261 can comprise a piston rod 262 and a piston disc 267 coupled to the piston rod 262. The piston disc 267 can be slidably received within the housing cavity 275 of the housing cylinder 270, and a seal can be formed between the piston disc 267 and the inner housing surface. The piston disc 267 can section the housing cavity 275 into an upper portion 276 and a lower portion 277, and fluid can be prevented from passing around the piston disc 267 between the top and lower portions 276,277. Thus, only the upper portion 276 of the housing cavity 275 can be in fluid communication with the shaft channel 295 when the valve stem 152 is in the open position. Example aspects of the piston rod 262 can define an upper rod end 263 coupled to the piston disc 267 and a lower rod end 264 (shown in FIG. 2A) opposite the upper rod end 263. The piston rod 262 can extend substantially downward from the piston disc 267, through a rod opening 272 formed in a lower cylinder wall 271 of the housing cylinder 270, and into the swivel cavity 238 of the swivel assembly 235. Housing openings 273 can be formed through the lower cylinder wall 271, such that lower portion 277 of the housing cavity 275 can be in fluid communication with the swivel cavity 238. Thus, the lower portion 277 of the housing cavity 275 can be in fluid communication with the stopper cavity 212 and with the pipeline 180 (shown in FIG. 2A). Referring back to FIG. 2A, the piston rod 262 can further extend through a lower plate opening 245 formed in the lower swivel plate 243 of the lower swivel cylinder 237. According to example aspects, the piston rod 262 can further define a rod block 265 disposed within the swivel cavity 238 and configured to abut the lower swivel plate 243. In the present aspect, the lower rod end 264 of the piston rod 262 can be coupled to a lower piston cap 266, as shown, and the lower actuation plate 231 can be mounted to the lower piston cap 266, as shown.

As previously described, the shaft channel 295 of the valve shaft 253 can be in fluid communication with the locking shaft channel 164. When the valve stem 152 is in the open position (i.e., the stem fluid pathway 251 is aligned with the shaft fluid pathway 259), fluid in the upper portion 276 of the housing cavity 275 can be released into the atmosphere through the open upper locking shaft end 163. Thus, with the valve stem 152 in the open position, the pressure assembly 260 can be in the open configuration, wherein the upper portion 276 is in fluid communication with the external atmosphere. When the valve stem 152 is in the closed position, fluid can be prevented from flowing through the stem fluid pathway 251, and thus can be prevented from flowing into or out of the upper portion 276 of the housing cavity 275. Thus, with the valve stem 152 in the closed position, the pressure assembly 260 can be in the closed configuration, wherein the upper portion 276 is sealed from the atmosphere. Furthermore, in the closed position, the shaft fluid pathway 259 can align with the equalization fluid pathway 252, which allows the upper portion 276 to be in fluid communication with the pipe channel 192 and/or the bonnet cavity 203.

According to example aspects, one or more of the actuation arms 220 can be directly or indirectly connected to the pressure assembly 260, and the actuation arms 220 can bias the expandable stopper body 204 to the expanded configuration when the pressure assembly 260 is in the open configuration. Similarly, the actuation arms 220 can draw the expandable stopper body 204 back to the contracted configuration when the pressure assembly 260 is in the closed configuration, as described in further detail below.

As shown in FIG. 2A, example aspects of the pipe stopper 140 can further comprise the locking assembly 160, which can be movable between an unlocked configuration, as shown, and a locked configuration, as shown in FIG. 7. In the locked configuration, the locking assembly 160 can lock the pipe stopper 140 in the expanded configuration. According to example aspects, the locking assembly 160 can comprise an upper locking ring 280 and a lower locking ring 281. As shown, the upper locking ring 280 can be oriented proximate to the upper shell end 207 of the split shell 205, and the lower locking ring 281 can be oriented proximate to the lower shell end 208 of the split shell 205. In some aspects, as shown, each of the upper and lower locking rings 280,281 can define an outer ring surface 282, an inner ring surface 283, and a ring sidewall 284 that can taper in diameter from the outer ring surface 282 to the inner ring surface 283. In some aspects, one or more notches 290 can extend substantially radially inward into the ring sidewall 284 of each of the upper and lower locking rings 280. Each of the notches 290 can be configured to receive a corresponding one of the bracket walls 225 therein. In the unlocked configuration, the upper and lower locking rings 280,281 can be disposed external, or at least partially external, to the stopper cavity 212, such that the upper and lower locking rings 280,281 do not interfere with the movement of the stopper assembly between the expanded and contracted configurations. In the locked configuration, each of the upper and lower locking rings 280,281 can be drawn into the stopper cavity 212, with the ring sidewalls 284 engaging the inner surface 211 of the split shell 205. The upper and lower locking rings 280,281 can span the expanded diameter of the split shell 205 in the expanded configuration to prohibit the split shell 205 from being contracted. In example aspects, the upper locking ring 280 can be operatively connected to the lower locking ring 281 by a linkage 285, such that movement of the upper locking ring 280 between the locked and unlocked configurations can cause the lower locking ring 281 to simultaneously move between the locked and unlocked configurations. As shown, each of the upper locking ring 280 and lower locking ring 281 can comprise a ring linkage bracket 291 which the linkage 285 can be pivotably connected to. Additionally, the linkage 285 can be pivotably connected to a shell linkage bracket 292 on the inner surface 211 of the split shell 205. In example aspects, the linkage 285 can be pivotably connected to the ring linkage brackets 291 and the shell linkage bracket 292 by fasteners. For example, the fasteners can be nut and bolt assemblies or any other suitable fastener known in the art.

Example aspects of the locking assembly 160 can further comprise the locking shaft 162 and a locking disc 286. The locking disc 286 can be coupled to the upper locking ring 280, as shown. The locking disc 286 can further be coupled to a lower locking shaft end 287 of the locking shaft 162 can be coupled to the locking disc 286. As previously described, the locking shaft 162 can extend through the bonnet cavity 203 and can pass through the bonnet opening 137 in the bonnet top plate 136 (shown in FIG. 1), such that the upper locking shaft end 163 (shown in FIG. 1) can be oriented external to the bonnet cavity 203. To move the upper and lower locking rings 280,281 between the locked and unlocked configuration, the locking shaft 162 can be lowered and raised, respectively. The locking shaft 162 can be lowered and raised manually by an operator, or the locking assembly 160 can be machine-operated.

FIGS. 3 and 4 illustrate the pipe stopper 140 in the lowered position and in the contracted configuration. The stopper fitting 105 (shown in FIG. 1) is removed from FIGS. 3 and 4 for full visibility of the pipe stopper 140. Referring to FIG. 3, after selectively setting the positions of the upper and lower chuck blocks 226,227 (shown in FIG. 2A) as described above, the pipe stopper 140 can be moved from the raised position, wherein the pipe stopper 140 is at least partially withdrawn from the pipe channel 192 (shown in FIG. 4), to the lowered position, wherein the pipe stopper 140 is positioned within the pipe channel 192. In aspects of the pipe stopper assembly 100 comprising the knife gate valve, the knife gate valve can be opened to allow the pipe stopper 140 to be inserted therethrough and into the stopper fitting 105. The pipe stopper 140 can be in the contracted configuration when lowered into the pipe channel 192, and a clearance 310 can be provided between the pipe sidewall 190 and the pipe stopper 140, such that pipeline fluid (e.g., gas) can continue to flow past the pipe stopper 140. As shown, the split shell 205 of the pipe stopper 140 can extend transversely across the pipe channel 192 and can extend beyond the upper pipe opening 393 and the lower pipe opening 294. In example aspects, the shell slot 300 of the split shell 205 can face the inlet pipe section 186 of the pipe 185, such that pipeline fluid flowing towards the pipe stopper 140 from the inlet pipe section 186 can enter the stopper cavity 212.

Referring to FIG. 4, the valve stem 152 can be in the closed position and the split shell 205 can be fully contracted prior to moving the pipe stopper 140 to the lowered position. To move the pipe stopper 140 to the lowered position, the valve shaft 253 can be pushed downward (e.g., manually or machine-driven), which can bias the valve shaft 253 against the upper actuation plate 230, forcing the pipe stopper 140 down into the pipe channel 192. As mentioned, prior to lowering the pipe stopper 140 into the pipe channel 192, the valve stem 152 can be in the closed position, as shown, such that the upper portion 276 of the housing cavity 275 can be in fluid communication with the stopper cavity 212 and the pipe channel 192. Furthermore, as described above, the stopper cavity 212 can also be in fluid communication with the lower portion 277 of the housing cavity 275. Thus, fluid in the pipeline 180 can enter both the upper portion 276 and the lower portion 277 of the housing cavity 275, such that the upper portion 276 and the lower portion 277 are at equal pressure. Thus, the piston 261 can remain stationary within the housing cavity 275 when the valve stem 152 is in the closed position.

FIGS. 5 and 6 illustrate the pipe stopper 140 in the expanded configuration. The stopper fitting 105 (shown in FIG. 1) is removed from FIGS. 5 and 6 for full visibility of the pipe stopper 140. Referring to FIG. 6, to bias the expandable stopper body 204 to the expanded configuration, the valve stem 152 can be rotated to the open position, such that the stem fluid pathway 251 can be aligned with the shaft fluid pathway 259. As described above, when the valve stem 152 is in the open position, the atmosphere external to the pipe stopper assembly 100 (shown in FIG. 1) can be in fluid communication with the upper portion 276 of the housing cavity 275. According to example aspects, the pressure of the atmospheric air can be less that the pressure of the pipeline fluid (e.g., gas) in the pipe channel 192. Thus, the greater pressure of the pipeline fluid in the lower portion 277 of the housing cavity 275 can bias the piston disc 267 of the piston 261 upward within the housing cavity 275, pushing the fluid out of the upper portion 276 and into the atmosphere. As the piston disc 267 moves upward, the piston rod 262 of the piston 261 can pull the lower actuation plate 231 upward. The lower actuation plate 231 can push upward against the lower chuck blocks 227, which can in turn push upward against the lower swivel plate 243 of the lower swivel cylinder 237. The upper swivel cylinder 236 can telescope into the lower swivel cylinder 237 as the lower swivel cylinder 237 moves upward. As describe above, the radial position of the upper and lower chuck blocks 226,227 can be set prior to lowering the expandable stopper body 204 into the pipe channel 192. As the lower chuck blocks 227 are pushed upward while maintaining their radial position, the proximal arm ends 224 of the lower actuation arms 222 attached thereto can be drawn upwards and can pivot relative to the lower chuck blocks 227. As the proximal arm ends 224 of the lower actuation arms 222 pivot, the distal arm ends 223 of the lower actuation arms 222 can pivot relative to the arcuate shell body 213. The vertical position of the distal arm ends 223 can remained fixed, and thus, the lower actuation arms 222 can move towards a horizontal orientation. As the lower actuation arms 222 move towards the horizontal orientation, the distal arm ends 223 attached to the arcuate shell body 213 can move radially outward, thus pushing and bending the arcuate shell body 213 radially outward.

The distal arm ends 223 of the upper actuation arms 221 can also be attached to the arcuate shell body 213. As the arcuate shell body 213 is biased outward, the upper actuation arms 221 can pivot relative to the arcuate shell body 213 and the upper chuck blocks 226, and the proximal arm ends 224 of the upper actuation arms 221 can be drawn downward, relative to the orientation shown, moving the upper actuation arms 221 towards a horizontal orientation. The corresponding upper chuck blocks 226 can be biased downward by the upper actuation arms 221 attached thereto, and the upper chuck blocks 226 can further push the upper swivel cylinder 236 downward to telescope further into the lower swivel cylinder 237. As shown, the upper swivel plate 242 of the upper swivel cylinder 236 can abut the housing cylinder 270 of the pressure housing 268 and can bias the pressure housing 268 downward as the upper swivel cylinder 236 moves downward. Furthermore, the upper actuation plate 230 can be mounted to the housing neck 269 of the pressure housing 268, and thus can be drawn downward as the pressure housing 268 moves downward.

As the arcuate shell body 213 is pushed radially outward by the actuation arms 220, the arcuate shell body 213 can bend to allow the diameter of the split shell 205 to be increased, and thus orienting the pipe stopper 140 in the expanded configuration. The outer surface 210 of the split shell 205 can seal with the pipe sidewall 190 to prohibit the flow of pipeline fluid past the pipe stopper 140. According to example aspects, the upper and lower locking rings 280,281 can then be moved from the unlocked position, as shown, to the locked position, as shown in FIG. 7, to reinforce the split shell 205 and to secure the pipe stopper 140 in the expanded configuration.

FIG. 7 illustrates the upper and lower locking rings 280,281 in the locked position. To move the upper and lower locking rings 280,281 to the locked position, the locking shaft 162 of the locking assembly 160 can be pushed downward. The locking disc 286 (shown in FIG. 2A) can be secured to the locking shaft 162 and to the upper locking ring 280, such that pushing the locking shaft 162 downward can bias the upper locking ring 280 downward into the stopper cavity 212 of the split shell 205. The upper locking ring 280 can be connected to the lower locking ring 281 by the linkage 285, and therefore, as the upper locking ring 280 is biased downward into the stopper cavity 212, the lower locking ring 281 can be drawn upward into the stopper cavity 212. As described above, in some aspects, each of the upper and lower locking rings 280,281 can define the tapered ring sidewall 284 (shown in FIG. 2A). The tapered ring sidewalls 284 can facilitate sliding the upper and lower locking rings 280,281 into the stopper cavity 212 and can increasingly press against the split shell 205 as they move to the locked position to ensure the split shell 205 is fully expanded within the pipe 185. The upper and lower locking rings 280,281 can further prevent the split shell 205 from contracting, and can thus lock the expandable stopper body 204 in the expanded configuration. Thus, the sealing of the split shell 205 with the pipe 185 is not reliant upon the pressure of the pipeline fluid being maintained consistently within the pipeline 180.

To move the upper and lower locking rings 280,281 from the locked position to the unlocked position, such as the remove the pipe stopper 140, the locking shaft 162 can be raised to withdraw the upper and lower locking rings 280,281 from the stopper cavity 212. To reorient the expandable stopper body 204 from the expanded configuration to the contracted configuration, the pressure in the housing cavity 275 must be equalized across the piston disc 267, such that the pressure in the upper portion 276 equals the pressure in the lower portion 277. According to example aspects, the valve stem 152 can be rotated to align the equalization fluid pathway 252 with the shaft opening 296 and the shaft fluid pathway 259. In the expanded configuration, the shaft opening 296 can clear the locking shaft 162, such that the shaft opening 296 can be in fluid communication with the stopper cavity 212. Pipeline fluid in the stopper cavity 212 can therefore flow into the upper portion 276 of the housing cavity 275 through the shaft opening 296, the equalization fluid pathway 252, the shaft fluid pathway 259, and the neck channel 278. With the pipeline fluid in both the upper portion 276 and the lower portion 277 of the housing cavity 275, the pressure across the piston disc 267 can be equalized, and the piston disc 267 can lower within the housing cavity 275. The arcuate shell body 213 can be naturally bias towards the contracted configuration, thereby lowering the piston 261. Additionally, the weight of lower swivel cylinder 237, the lower chuck blocks 227 and lower actuation arms 222, and the lower actuation plate 231 can draw the piston 261 downward.

Figure 8:
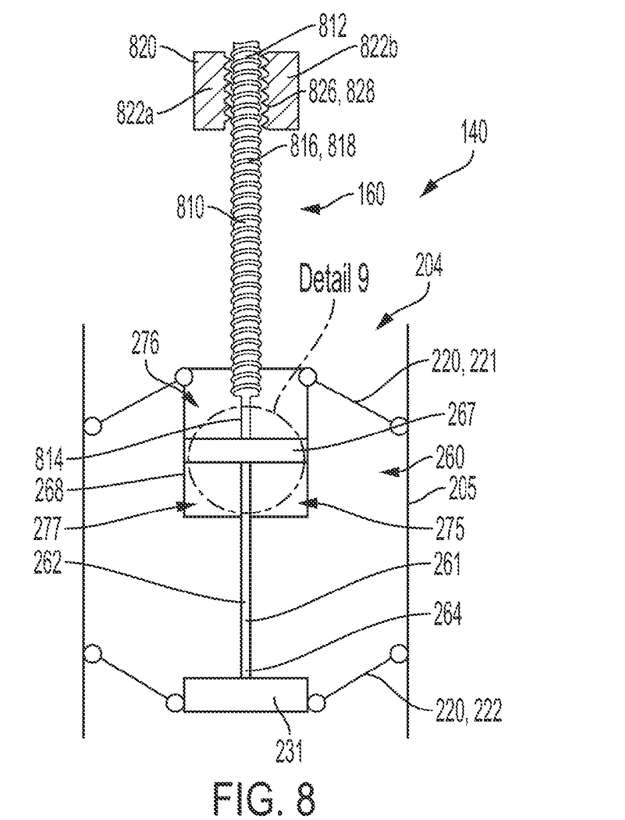
FIG. 8 is a front view of the pipe stopper in accordance with another aspect of present disclosure.

FIG. 8 illustrates a schematic of the pipe stopper 140, shown from the front, according to another example aspect of the present disclosure, wherein the locking assembly 160 and the pressure assembly 260 can be different than previously described. As shown, like the pipe stopper 140 of FIGS. 1-7, the pipe stopper 140 of the present aspect can comprise the split shell 205 and the actuation arms 220 pivotably connected thereto. The pipe stopper 140 can further comprise the pressure assembly 260. The pressure assembly 260 can comprise the piston 261 and the pressure housing 268, as well as the lower actuation plate 231, which can be operatively coupled to the lower rod end 264 of the piston rod 262. The upper actuation arms 221 can be pivotably connected to the pressure housing 268, and the lower actuation arms 222 can be pivotably connected to the lower actuation plate 231.

In the present aspect, the locking assembly 160 can comprise a locking rod 810. The locking rod 810 can define an upper end 812 and a lower end 814. The lower end 814 can be disposed within the housing cavity 275 of the pressure housing 268 and can engage the piston disc 267, as described in further detail below with respect to FIG. 9. The upper end 812 can be oriented external to the housing cavity 275. According to example aspects, the locking rod 810 can define a rod engagement mechanism 816 proximate to the upper end 812 thereof. In the present aspect, the rod engagement mechanism 816 can be external threading 818; however, in other aspects, the rod engagement mechanism 816, can be gear teeth, ratchet teeth, or the like. Example aspects of the locking assembly 160 can further comprise a locking clamp 820, which can be oriented in a locked configuration and an unlocked configuration. In the present aspect, the locking clamp 820 can comprise a pair of clamp segments 822a,b, and the clamp segments 822a,b can define a clamp engagement mechanism 826 configured to engage with the rod engagement mechanism 816 in the locked configuration. In the present aspect, the clamp engagement mechanism 826 can be a threaded bore 828, and each of the clamp segments 822a,b can define a portion of the threaded bore 828. In other aspects, the clamp engagement mechanism 826 can be a mating gear, a pawl, or the like.

In the unlocked configuration, the clamp segments 822a,b can be detached from the locking rod 810, such the locking rod 810 can be movable relative to the locking clamp 820. According to example aspects, the locking clamp 820 can be in the unlocked configuration until the expandable stopper body 204 moves to the expanded configuration and the split shell 205 seals with the pipe 185 (shown in FIG. 1). In the locked configuration, the clamp segments 822a,b can be clamped around the locking rod 810 to retain the locking rod 810 in a fixed position. For example, in the present aspect, the external threading 818 of the locking rod 810 can engage the threaded bore 828 of the locking clamp 820 to secure the locking rod 810 in position relative to the locking clamp 820. Furthermore, the engagement of the locking rod 810 with the piston disc 267 can prohibit movement of the piston 261, thereby locking the expandable stopper body 204 in the expanded configuration.

Figure 9:
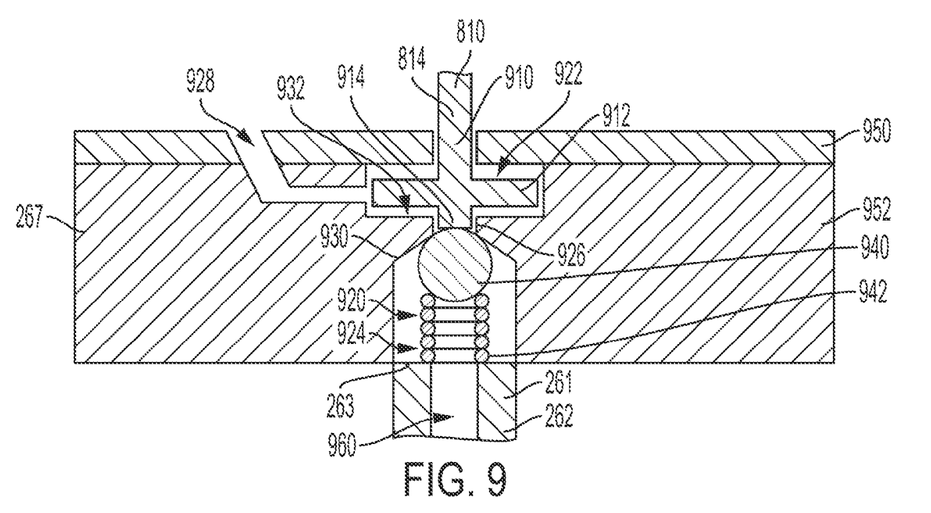
FIG. 9 is a front view of Detail 9 taken from FIG. 8.

FIG. 9 illustrates Detail 9 taken from FIG. 8, which illustrates a cross-sectional view of the locking rod 810 engaged with the piston disc 267. In the present aspect, a rod channel 960 can be formed through the piston rod 262, which can be in fluid communication with the pipe channel 192 (shown in FIG. 1). The piston disc 267 can define an equalization chamber 920 and an equalization port 928. The equalization chamber 920 can define an upper chamber section 922 and a lower chamber section 924, and a chamber neck 926 can extend between the upper and lower chamber sections 922,924. The equalization port 928 can be in fluid communication with the upper chamber section 922 and with the upper portion 276 (shown in FIG. 8) of the housing cavity 275 (shown in FIG. 8). The chamber neck 926 can define a diameter than can be less than a diameter of the upper chamber section 922 and less than a diameter of the lower chamber section 924. Furthermore, as shown, the lower chamber section 924 can define a chamber seat 930 adjacent to the chamber neck 926, and the upper chamber section 922 can define a chamber shoulder 932 adjacent to the chamber neck 926. The equalization chamber 920 can be in fluid communication with the rod channel 960, such that pipeline fluid (e.g., gas) from the pipeline 180 (shown in FIG. 1) can flow into the equalization chamber 920 through the rod channel 960.

Example aspects of the piston 261 can further comprise a sealing ball 940 and a spring 942 received within the equalization chamber 920, as shown. The spring 942 can extend from the upper rod end 263 of the piston rod 262, and the sealing ball 940 can be coupled to the spring 942 distal to the upper rod end 263. The spring 942 can be configured to bias the sealing ball 940 against the chamber seat 930 of the lower chamber section 924, as shown. When the sealing ball 940 is seated with the chamber seat 930, the sealing ball 940 can seal the chamber neck 926 and the upper chamber section 922 off from the lower chamber section 924, preventing fluid flow between the upper and lower chamber sections 922,924. Thus, fluid can be prohibited from flowing through the piston disc 267, and the upper portion 276 of the housing cavity 275 can be sealed off from the lower portion 277 (shown in FIG. 8) of the housing cavity 275. The pressure assembly 260 (shown in FIG. 8) can be configured to operate substantially as described above when expanding the expandable stopper body 204 (shown in FIG. 8) to the expanded configuration. However, the method of equalizing the pressure in the top and lower portions 276,277 of the housing cavity 275 can differ in the present aspect, as described below.

In the present aspect, the lower end 814 of the locking rod 810 can serve as a component of the pressure assembly 260. As shown, an equalization piston 910 can be defined at the lower end 814 of the locking rod 810, and the equalization piston 910 can be received within the upper chamber section 922 of the equalization chamber 920. To secure the equalization piston 910 within the upper chamber, the piston disc 267 can comprise an upper piston plate 950 and a lower piston body 952 between which the equalization piston 910 can be received. The equalization piston 910 can define a substantially annular flange 912, and a projection 914 can extend from the annular flange 912 towards the lower chamber section 924. In example aspects, the projection 914 can be sized to extend through the chamber neck 926 of the equalization chamber 920; however, the chamber shoulder 932 can prevent the annular flange 912 from entering the chamber neck 926.

To unlock the expandable stopper body 204 and to equalize the pressure in the top and lower portions 276,277 of the housing cavity 275, the locking clamp 820 (shown in FIG. 8) can be driven to rotate the locking rod 810 therein, which can move the locking rod 810 in the downward direction, relative to the orientation shown. As the locking rod 810 moves downward, the projection 914 of the equalization piston 910 can extend into and through the chamber neck 926 of the equalization chamber 920. The projection 914 can contact the sealing ball 940 and push the sealing ball 940 away from the chamber seat 930. With the sealing ball 940 unseated, pipeline fluid can flow from the lower chamber section 924 into the upper chamber section 922, through the equalization port 928, and into the upper portion 276 of the housing cavity 275. Once the pressure has equalized within the top and lower portions 276,277, the locking clamp 820 can release the locking rod 810 and move back to the unlocked configuration.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of using a pipe stopper to stop fluid flow through a pipeline, the method comprising:
   providing the pipe stopper, the pipe stopper comprising an expandable stopper body and a pressure assembly, the expandable stopper body configurable in an expanded configuration and a contracted configuration, the pressure assembly configurable in an open configuration and a closed configuration and comprising a housing cavity;
   lowering the expandable stopper body of the pipe stopper into a pipe channel of the pipeline in the contracted configuration;
   orienting the pressure assembly in the open configuration, wherein an upper portion of the housing cavity is in fluid communication with an atmosphere external to the pipeline and a lower portion of the housing cavity is in fluid communication with the pipe channel; and
   biasing the expandable stopper body to the expanded configuration to block fluid flow through the pipe channel.

2. The method of claim 1, wherein:
   the pipe stopper further comprises a valve stem defining a stem fluid pathway in fluid communication with the atmosphere;
   orienting the pressure assembly in the open configuration comprises rotating the valve stem from a closed position to an open position; and
   in the open position, the stem fluid pathway is in fluid communication with the upper portion of the housing cavity.

3. The method of claim 2, further comprising orienting the pressure assembly in the closed configuration and biasing the expandable stopper body to the contracted configuration to allow fluid flow through the pipe channel, wherein, in the closed configuration, each of the upper portion and the lower portion of the housing cavity are in fluid communication with the pipe channel.

4. The method of claim 3, wherein:
   the valve stem further defines an equalization fluid pathway;
   orienting the pressure assembly in the closed configuration comprises rotating the valve stem from the open position to the closed position; and
   in the closed position, the equalization fluid pathway is in fluid communication with the upper portion of the housing cavity and with the pipe channel.

5. The method of claim 4, wherein the pressure assembly further comprises a piston slidably engaged with the housing cavity and operatively connected to the expandable stopper body.

6. The method of claim 5, wherein:
   the piston comprises a piston disc sealing the upper portion of the housing cavity from the lower portion of the housing cavity;
   the piston further comprises a piston rod extend from the piston disc, through the lower portion, and passing through a piston opening in a pressure housing of the pressure assembly;
   the pressure housing defines the housing cavity; and
   the piston rod is operatively connected to the expandable stopper body.

7. The method of claim 1, wherein the pressure assembly further comprises a piston, the pipe stopper further comprises an actuation arm pivotably connected to the expandable stopper body and pivotably connected to the pressure assembly, and the actuation arm is configured to move the expandable stopper body between the expanded configuration and the contracted configuration as the piston slides within the housing cavity.

8. The method of claim 7, further comprising a chuck block and a swivel cylinder, the actuation arm pivotably coupled to the chuck block, the swivel cylinder movably engaged with the chuck block, wherein the method further comprises rotating the swivel cylinder and moving the chuck block as the swivel cylinder is rotated to adjust a radial position the chuck block relative to the swivel cylinder and thereby adjust a diameter of the pipe stopper.

9. The method of claim 8, wherein the swivel cylinder defines a spiral track, the spiral track is slidably engaged with the chuck block, and moving the chuck block as the swivel cylinder is rotated comprises riding the chuck block on the spiral track as the swivel cylinder is rotated.

10. The method of claim 8, wherein
    the actuation arm is an upper actuation arm, the chuck block is an upper chuck block, and the swivel cylinder is an upper swivel cylinder;
    the pipe stopper further comprises a lower chuck block, a lower swivel cylinder, and a lower actuation arm pivotably coupled to the lower chuck block;
    the lower swivel cylinder is movably engaged with the lower chuck block;
    the lower swivel cylinder is configured to rotate; and
    the lower chuck block is configured to move as the lower swivel cylinder rotates to adjust a radial position the lower chuck block relative to the lower swivel cylinder and thereby adjust the diameter of the pipe stopper.

11. The method of claim 10, wherein:
    the upper chuck block is disposed between the upper swivel cylinder and an upper actuation plate;
    the upper chuck block is configured to engage an upper block recess of the upper actuation plate and to slide radially within the upper block recess;
    the lower chuck block is disposed between the lower swivel cylinder and a lower actuation plate; and
    the lower chuck block is configured to engage a lower block recess of the lower actuation plate and is configured to slide radially within the lower block recess.

12. The method of claim 10, wherein the expandable stopper body comprises a shell, the shell defining a stopper cavity and further defining an opening providing fluid communication to the stopper cavity through the shell, the upper swivel cylinder and the lower swivel cylinder disposed within the stopper cavity.

13. The method of claim 12, wherein:
    the upper swivel cylinder and the lower swivel cylinder together define a swivel cavity;
    the swivel cavity is in fluid communication with the stopper cavity; and the upper swivel cylinder is configured to telescope within the lower swivel cylinder.

14. The method of claim 13, wherein at least one of the upper swivel cylinder and the lower swivel cylinder defines a cylinder opening formed therethrough, the swivel cavity in fluid communication with the stopper cavity.

15. The method of claim 14, wherein:
one of the upper swivel cylinder and the lower swivel cylinder defines a longitudinal cylinder slot; and
the other of the upper swivel cylinder and the lower swivel cylinder defines a longitudinal cylinder rib slidably engaging the longitudinal cylinder slot.

16. The method of claim 12, wherein the shell comprises bendable arcuate shell body.

17. The method of claim 1, wherein the pipe stopper further comprises a locking assembly, and wherein the method further comprises engaging the locking assembly with the expandable stopper body and to prohibit contraction of the expandable stopper body and to secure the pipe stopper in the expanded configuration.

18. The method of claim 17, wherein:
the locking assembly comprises a locking ring movable between a locked configuration and an unlocked configuration; and
engaging the locking assembly with the expandable stopper body comprises drawing the locking ring into a stopper cavity of the expandable stopper body and engaging an inner surface of the expandable stopper body in the locked configuration.

19. The method of claim 18, wherein the method further comprises at least partially withdrawing the locking ring from the stopper cavity and disengaging the inner surface of the expandable stopper body in the unlocked configuration.

20. The method of claim 18, wherein:

the locking ring is an upper locking ring;

the locking assembly further comprises a lower locking ring;

the pressure assembly is disposed between the upper locking ring and the lower locking ring; and the upper locking ring is operatively coupled to the lower locking ring by a linkage for simultaneous movement of the upper locking ring and the lower locking ring between the locked configuration and the unlocked configuration.

* * * * *